(12) United States Patent
Iwasawa

(10) Patent No.: US 7,800,829 B2
(45) Date of Patent: Sep. 21, 2010

(54) ZOOM LENS AND IMAGE PICK-UP APPARATUS USING ZOOM LENS

(75) Inventor: Yoshito Iwasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 516 days.

(21) Appl. No.: 10/592,920

(22) PCT Filed: Feb. 15, 2005

(86) PCT No.: PCT/JP2005/002279

§ 371 (c)(1),
(2), (4) Date: Sep. 15, 2006

(87) PCT Pub. No.: WO2005/091043

PCT Pub. Date: Sep. 29, 2005

(65) Prior Publication Data

US 2008/0247053 A1    Oct. 9, 2008

(30) Foreign Application Priority Data

Mar. 17, 2004   (JP)   ............... 2004-077211

(51) Int. Cl.
*G02B 15/14* (2006.01)
*G02B 17/00* (2006.01)
*G02B 7/00* (2006.01)
(52) U.S. Cl. .................. 359/676; 359/733; 359/817
(58) Field of Classification Search .............. 359/676, 359/683
See application file for complete search history.

(56) References Cited

U.S. PATENT DOCUMENTS

| 6,754,446 | B2* | 6/2004 | Hagimori et al. | .............. 396/72 |
| 7,301,710 | B2* | 11/2007 | Nishioka et al. | ............ 359/676 |
| 7,436,599 | B2* | 10/2008 | Mihara et al. | ............... 359/676 |

FOREIGN PATENT DOCUMENTS

| JP | 9 133858 | 5/1997 |
| JP | 2003 43354 | 2/2003 |
| JP | 2003 169236 | 6/2003 |
| JP | 2003 262907 | 9/2003 |
| JP | 2003 302576 | 10/2003 |
| JP | 2003 329932 | 11/2003 |
| JP | 2003 344897 | 12/2003 |
| JP | 2004 37967 | 2/2004 |
| WO | WO 03 085438 | 10/2003 |

* cited by examiner

*Primary Examiner*—Jordan M. Schwartz
(74) *Attorney, Agent, or Firm*—Frommer Lawrence & Haug LLP; William S. Frommer; Thomas F. Presson

(57) ABSTRACT

A zoom lens composed of plural groups and adapted for changing group spacing or spacings, and includes, in a first group GR1 fixed during zooming operation, a reflection member M for bending or folding the optical axis substantially by 90 degrees and a negative group at the object side relative to the reflection member M. At the image side of the first group GR1, there are at least included a second group GR2 movable during zooming operation and having negative refractive power, and a light quantity adjustment member ST1 fixed during zooming operation. Angle of the reflection member M is changed at the time of sinking lens barrel so that the negative group of the first group GR1 is accommodated into a space thus defined.

4 Claims, 11 Drawing Sheets

ZOOM LENS AND IMAGE PICK-UP APPARATUS USING ZOOM LENS

TECHNICAL FIELD

The present invention relates to a zoom lens compact and adapted for attaining realization of thin structure in the camera depth direction, which is suitable when used in image pick-up optical system of digital input/output equipment such as digital still camera and/or video camera, and an image pick-up apparatus using such a zoom lens.

This Application claims priority of Japanese Patent Application No. 2004-077211, filed on Mar. 17, 2004, the entirety of which is incorporated by reference herein.

BACKGROUND ART

Hitherto, image pick-up apparatuses using solid-state image pick-up device such as digital still camera, etc. are being popularized. With popularization of such digital still camera, realization of higher picture quality is required. Particularly, in digital still camera having a large number of pixels, etc., photographing (imaging) zoom lenses excellent in image formation performance, which comply with solid-state image pick-up device having a large number of pixels, are required. Further, there also exists strong demands for miniaturization and realization of low cost so that compact, inexpensive and/or high performance zoom lenses are required.

For example, in the optical system described in the Japanese Patent Application Laid Open No. 1996-248318 publication, prism is inserted into a first group having positive refractive power to thereby bend or fold the optical system to promote miniaturization in the optical axis direction. In the optical system of this type, front (optical) gem (front lens element) and reflection member are large by the configuration of plus lead so that miniaturization is not sufficient.

DISCLOSURE OF THE INVENTION

Problems to be Solved by the Invention

An object of the present invention is to provide a novel zoom lens which can eliminate or solve problems that conventional zoom lenses have, and an image pick-up apparatus using such a zoom lens.

Another object of the present invention is to provide a zoom lens compact and adapted for attaining realization of thin structure in the camera depth direction which is used in video camera and/or digital still camera, etc., and an image pick-up apparatus using such a zoom lens.

The present invention is directed to a zoom lens composed of plural groups and adapted to change group spacing or spacings to thereby perform magnification changing or adjusting operation, the zoom lens at least including: a first group at least including a reflection member for bending or folding the optical axis and a negative group (being a negative subgroup of the first group) at an object side relative to the reflection member, and fixed during changing or adjusting operation; a second group movably provided during magnification changing or adjusting operation at an image side of the first group and having negative refractive power; and a light quantity adjustment member fixed during zooming operation, wherein the reflection member is withdrawn at the time of sinking lens barrel so that the negative group of the first group is accommodated into a space thus defined.

Moreover, the present invention is directed to an image pick-up apparatus comprising a zoom lens, and an optical pick-up device for converging an optical image which has been formed by the zoom lens into an electric signal, wherein there is used, as the zoom lens used in the image pick-up apparatus, a zoom lens at least including: a first group at least including a reflection member for bending or folding the optical axis and a negative group at an object side relative to the reflection member, and fixed during magnification changing or adjusting operation; a second group movably provided during magnification changing or adjusting operation at an image side of the first group and having negative refractive power; and a light quantity adjustment member fixed during zooming operation, wherein the reflection member is withdrawn at the time of sinking lens barrel so that the negative group of the first group is accommodated into a space thus defined.

In the zoom lens according to the present invention, the length in the incident optical axis direction can be shortened to much degree while maintaining high magnification changeable factor and high picture quality, and the front gem diameter and/or the reflection member can be reduced by the configuration of minus lead. Further, at the time of sinking lens barrel, arrangement angle of the reflection member is changed to thereby withdraw the reflection member to accommodate the negative group of the first group into space thus defined thus to have ability to attain miniaturization at the time of sinking lens barrel. Moreover, since the light quantity adjustment member for adjusting light quantity is fixed during zooming operation, the mirror cylindrical configuration can become compact.

Further, in the image pick-up apparatus according to the present invention, the image formation performance can be improved, and the length in the incident optical axis direction of the zoom lens system is reduced thus to have ability to reduce the front gem diameter and/or the reflection member. Thus, the mirror cylindrical configuration can become compact and miniaturization at the time of sinking lens barrel can be attained. Accordingly, image pick-up apparatus which is compact and is caused to be of thin structure can be realized.

The present invention is applied, thereby making it possible to attain improvement in the image formation performance and miniaturization of zoom lens used in video camera and/or digital still camera, etc.

Still further objects of the present invention and merits obtained by the present invention will become more apparent from the embodiments which will be explained below with reference to the attached drawings.

BEST MODE FOR CARRYING OUT THE INVENTION

First to third embodiments of a zoom lens of the present invention will now be explained by using FIGS. 1 to 3.

FIGS. 1 to 3 are lens configuration diagrams respectively corresponding to zoom lenses constituting these first to third embodiments, wherein lens arrangements at broad angle end (a) and telescopic end (b) are indicated by the optical cross section. Arrows mj (j=1, 2, . . . ) in respective lens configuration diagrams respectively show, in a model form, movement of the j-th lens group (GRj), etc. in zooming operation from the broad angle end state (a) to the telescopic end state (b). Moreover, in the respective lens configuration diagrams, plane surface to which ri (i=1, 2, . . . ) is attached is the i-th plane surface counted from the object surface side. Further, in respective lens configuration diagrams, I indicates image surface of the image pick-up device, CG indicates cover glass of the image pick-up device, and LPF indicates low-pass filter.

As shown in the lens configuration diagram of FIG. 1, the zoom lens of the first embodiment is composed, in order from the object side, of a positive first lens group GR1, a negative second lens group GR2, a positive third lens group GR3, a positive fourth lens group GR4, and a negative fifth lens group GR5.

The first lens GR1 is composed of a negative lens, a reflection mirror M for bending or folding the optical axis by 90°, and a positive lens having non-spherical surfaces at the both surface sides thereof. The second lens group GR2 is composed of a negative lens, and a connection lens of a negative lens and a positive lens. The third lens group GR3 is comprised of a positive lens having non-spherical surfaces at the both surface sides thereof. The fourth lens group GR4 is comprised of a connection lens of a positive lens and having non-spherical surface at the object side, and a negative lens. The fifth lens group GR5 is composed of a connection lens of a negative lens and a positive lens, and a positive lens. The positions of the first lens group GR1, the third lens group GR3, the fifth lens group GR5 and the low-pass filter LPF are fixed at zooming operation. Moreover, the third lens group includes an iris as a light quantity adjustment member ST1 at the image surface side. The light quantity adjustment member ST1 also has a function as an aperture limiting member.

Figure 1A:
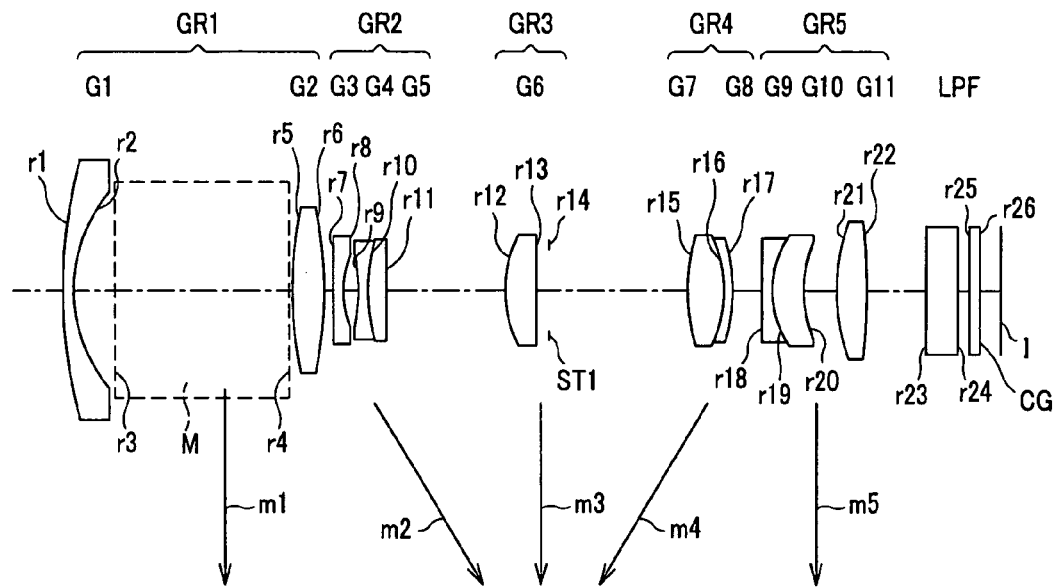
FIGS. 1A and 1B are lens configuration diagrams of a first embodiment of a zoom lens to which the present invention is applied.
Figure 1B:
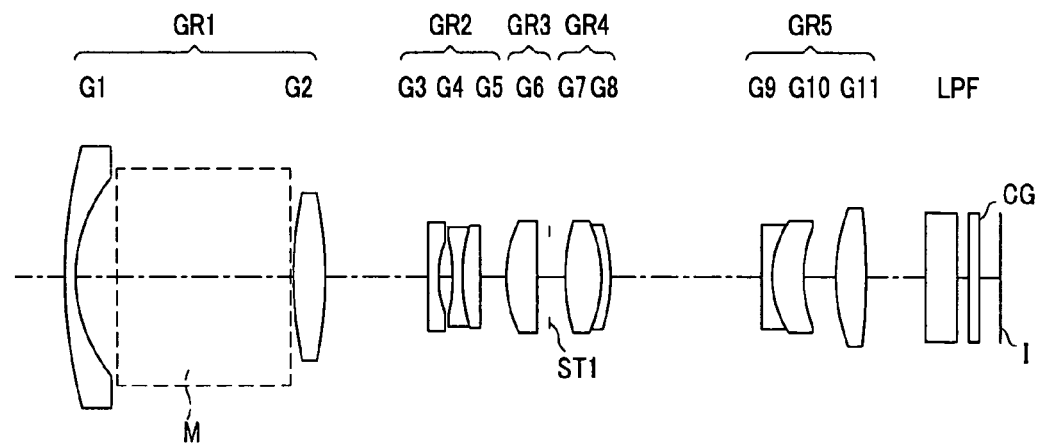

In performing magnification changing or adjusting operation from the wide angle end state of FIG. 1(a) to the telescopic end state of FIG. 1(b), the second lens group moves toward the fixed third lens group GR3 side, and the fourth lens group GR4 moves toward the fixed third lens group GR3 side.

Figure 13:
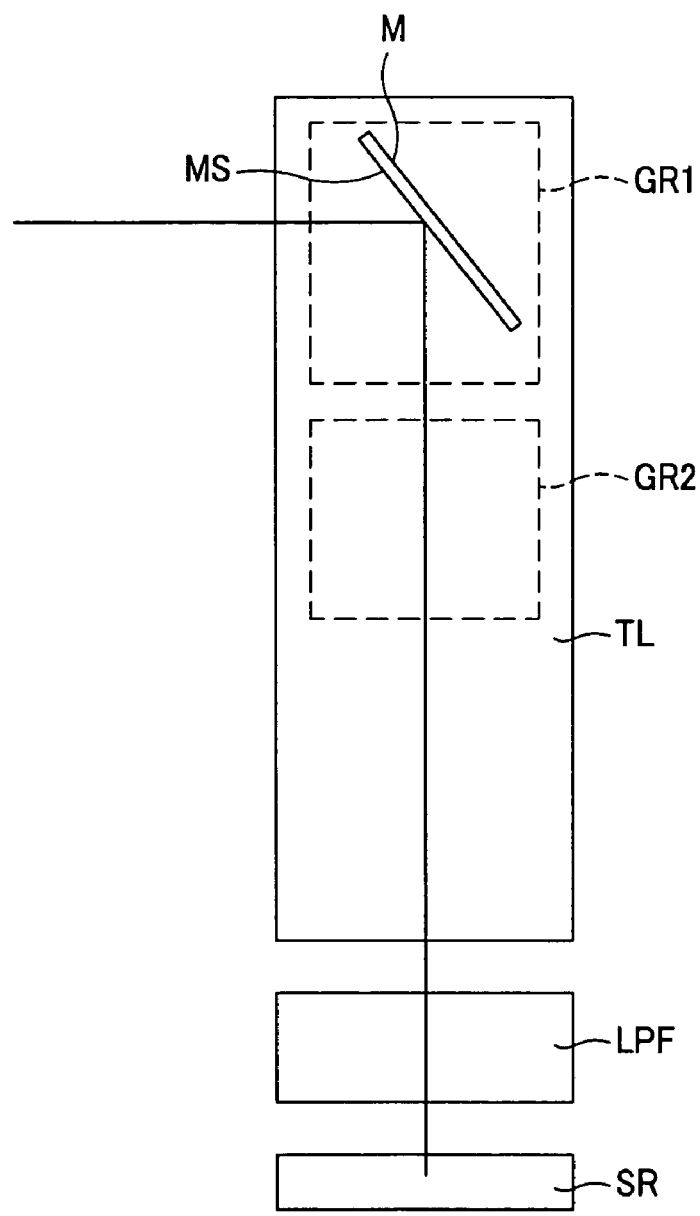
FIG. 13 is a configuration diagram showing outline of the present invention.

Further, actual arrangement in the shortest focal length state of the zoom lens system of the first embodiment is shown in FIG. 13. While the configuration of the reflection member is schematically represented as parallel flat plate in the lens configuration diagram of FIG. 1, reflection mirror M is disposed as shown in FIG. 13 as actual configuration. Here, in FIG. 13, TL indicates the zoom lens system, MS indicates reflection surface of the reflection mirror M, and SR indicates image pick-up device. This similarly applies to the zoom lens systems of the second and third embodiments which will be described later.

Figure 14A:
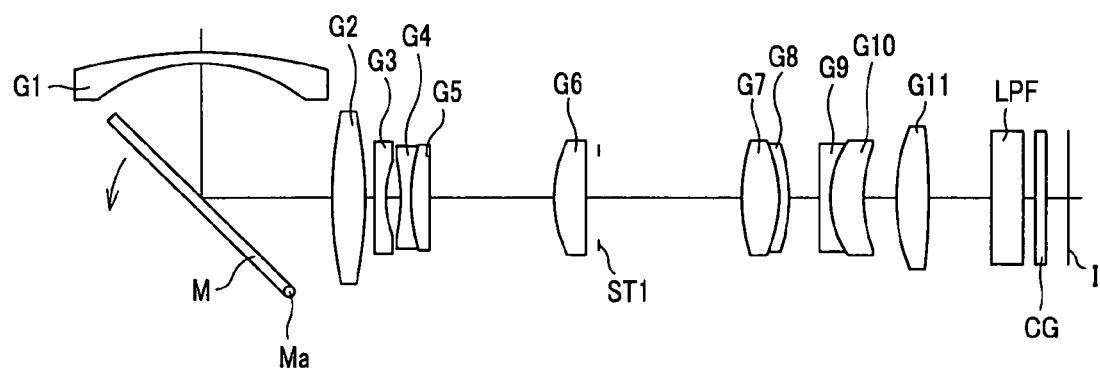
FIGS. 14A and 14B are cross sectional views for explaining a lens barrel sinking system of the present invention.
Figure 14B:
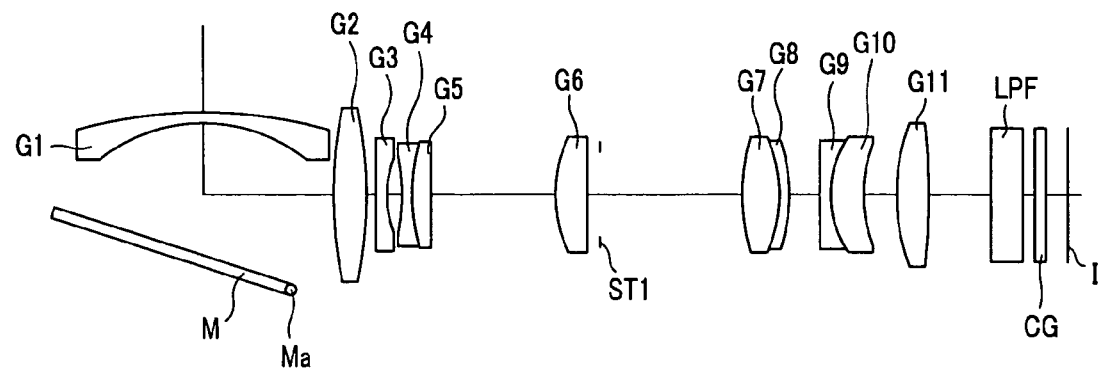

Moreover, an example of the lens barrel sinking system of the zoom lens system of the first embodiment will be explained with reference to FIGS. 14A and 14B. FIG. 14A is a cross sectional view including optical path bending optical axis of the state where the zoom lens system of FIG. 1 is located at the broad angle end (see FIG. 1A). In this state, the reflection mirror M of the first group GR1 is rotated with one end side Ma thereof being as fulcrum so that the reflection mirror M will be withdrawn as indicated by the arrow in FIG. 14A. Thus, the negative lens G1 of the object side of the first lens group GR1 is caused to undergo lens barrel sinking operation into space defined (formed) as the result of the fact that the reflection mirror M is withdrawn to have ability to thin the thickness in the optical axis direction (the camera depth direction) incident on the zoom lens system. It is to be noted that this also similarly applies to the zoom lens systems of the second and third embodiments which will be described later. Here, while there is employed, in this embodiment, a configuration in which only one negative lens G1 is caused to undergo lens barrel sinking operation into space defined as the result of the fact that the reflection mirror M is withdrawn, in the case where there is employed a configuration including plural lenses at the object side relative to the reflection mirror M, plural lenses may be also caused to undergo lens barrel sinking operation. Moreover, while there is employed, in this zoom lens system, a configuration in which the reflection mirror M is rotated with one end side Ma thereof being as fulcrum so that the reflection M is withdrawn, the position of the fulcrum is not limited to one end side of the mirror. In addition, while there is employed, in this zoom lens system, the configuration in which the reflection mirror M is rotated with one end side Ma thereof being as fulcrum so that the reflection mirror M is withdrawn, withdrawal operation of the reflection mirror M is not limited to such implementation, but there may be defined a space for accommodating lens group of the object side relative to the reflection mirror M. For example, there may be employed a configuration to move the reflection mirror M in parallel to withdraw the reflection mirror M.

As shown in the lens configuration diagram of FIG. 2, the zoom lens of the second embodiment is composed, in order from the object side, a negative first lens group GR1, a negative second group GR2, a positive third lens group GR3, a light quantity adjustment member ST1, and a positive fourth lens group GR4.

The first lens group GR1 is composed of a negative lens, and a reflection mirror M for bending or folding the optical axis by 90°. The second lens group GR2 is composed of a negative lens having non-spherical surfaces at the both surface sides thereof, and a positive lens. The third lens group GR3 is composed of a positive lens having non-spherical surface at the both surface sides thereof, a connection lens of a positive lens and a negative lens, and a positive lens. The fourth lens group GR4 is comprised of a positive lens having non-spherical surfaces at the both surface sides thereof. Between the third lens group GR3 and the fourth lens group GR4, a ND filter for adjusting light quantity and a light quantity adjustment member ST1 such as liquid crystal, etc. are fixed. The positions of the first lens group GR1 and the low-pass filter LPF are fixed at zooming operation. Moreover, the third lens group GR3 includes an iris as an aperture limiting member ST2 for limiting aperture diameter at the side closest to the object.

Figure 2A:
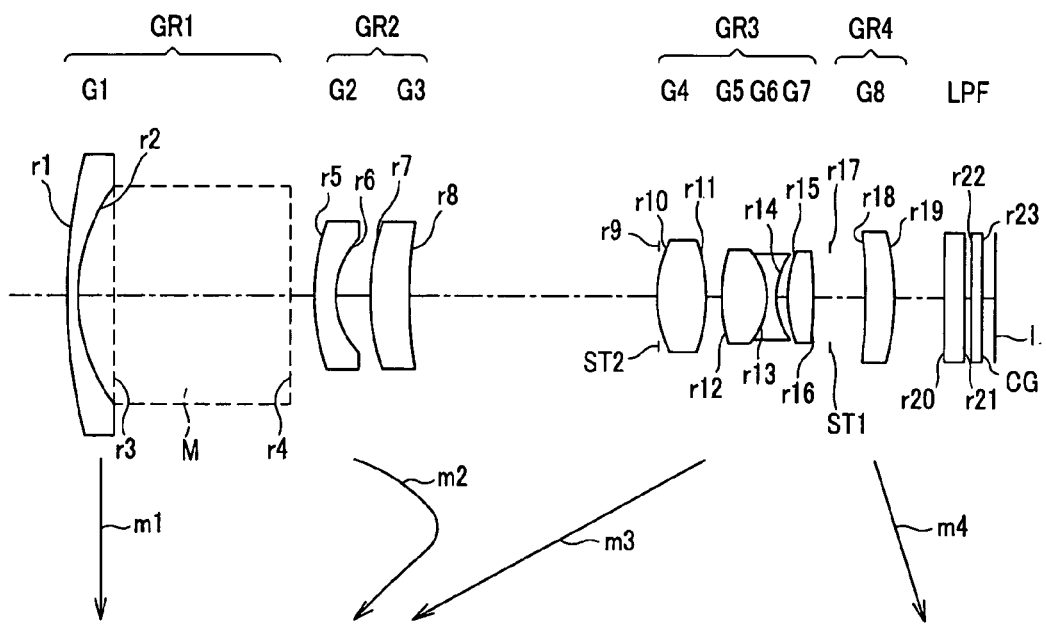
FIGS. 2A and 2B are lens configuration diagrams of a second embodiment of a zoom lens to which the present invention is applied.
Figure 2B:
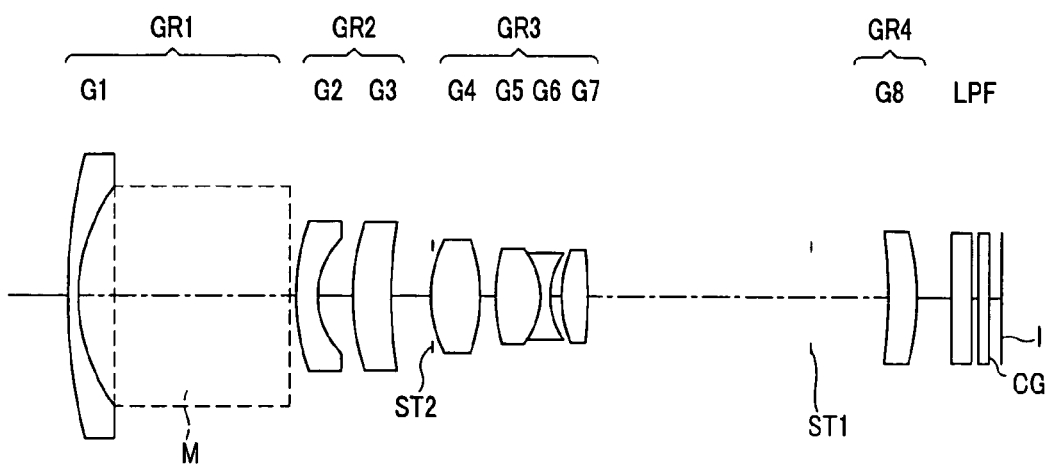

In performing magnification changing or adjusting operation from the broad angle end state shown in FIG. 2(a) to the telescopic end state shown in FIG. 2(b), the second lens group GR2 moves toward the image surface side thereafter to perform U-turn toward the object side. The third lens group GR3 moves towards the object side, and the fourth lens group moves to a little degree toward the image surface side.

As shown in the lens configuration diagram shown in FIG. 3, the zoom lens of the third embodiment is composed, in order from the object side, of a negative first lens group GR1, a negative second lens group GR2, a positive third lens group GR3, a positive fourth lens group GR4, and a positive fifth lens group GR5.

The first lens group GR1 is composed of a negative lens, and a reflection mirror for bending or folding the optical path by 90°. The second lens group GR2 is composed of a negative lens having non-spherical surfaces at the both surface sides thereof, and a positive lens. The third lens group GR3 is comprised of a positive lens having non-spherical surfaces at the both surface sides thereof. The fourth lens group GR4 is composed of a positive lens, and a connection lens of a positive lens and a negative lens. The fifth lens group GR5 is comprised of a positive lens having non-spherical surfaces at the both surface sides thereof. The positions of the first lens group GR1, the third lens group GR3 and the low-pass filter LPF are fixed at zooming operation. Moreover, the third lens group includes an iris as a light quantity adjustment member ST1 at the image surface side.

Figure 3A:
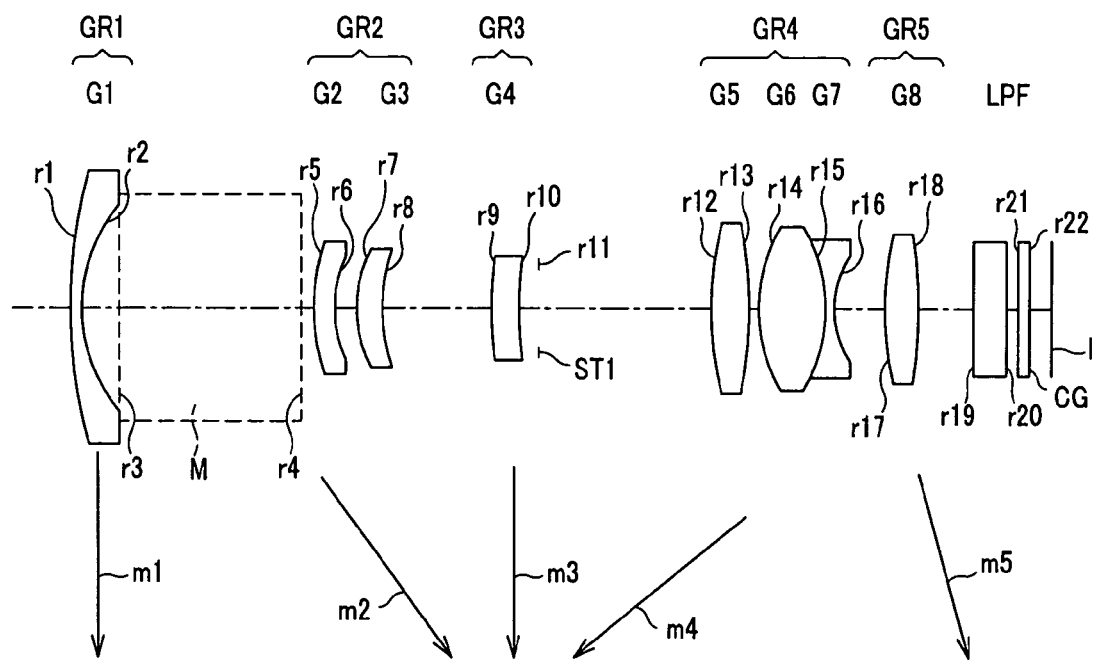
FIGS. 3A and 3B are lens configuration diagrams of a third embodiment of a zoom lens to which the present invention is applied.
Figure 3B:
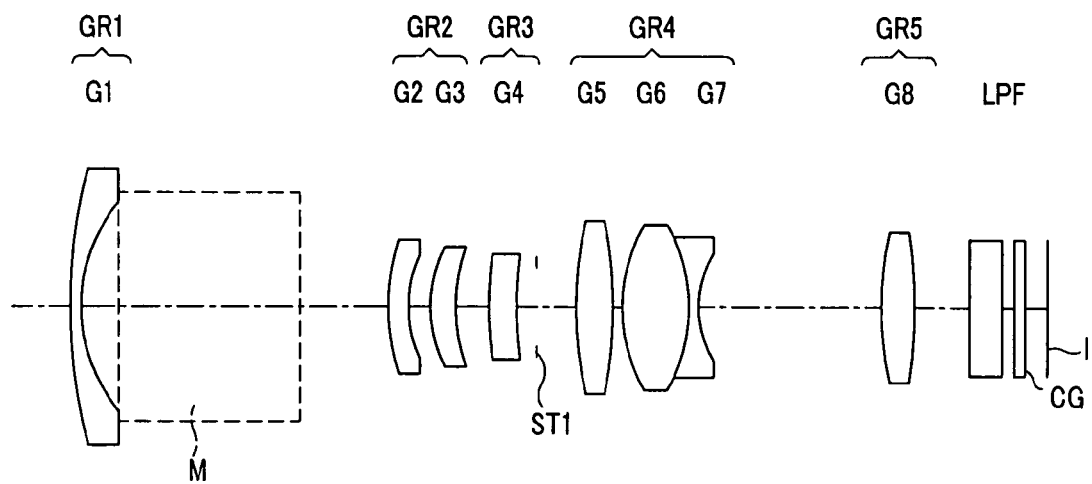
Figure 4:
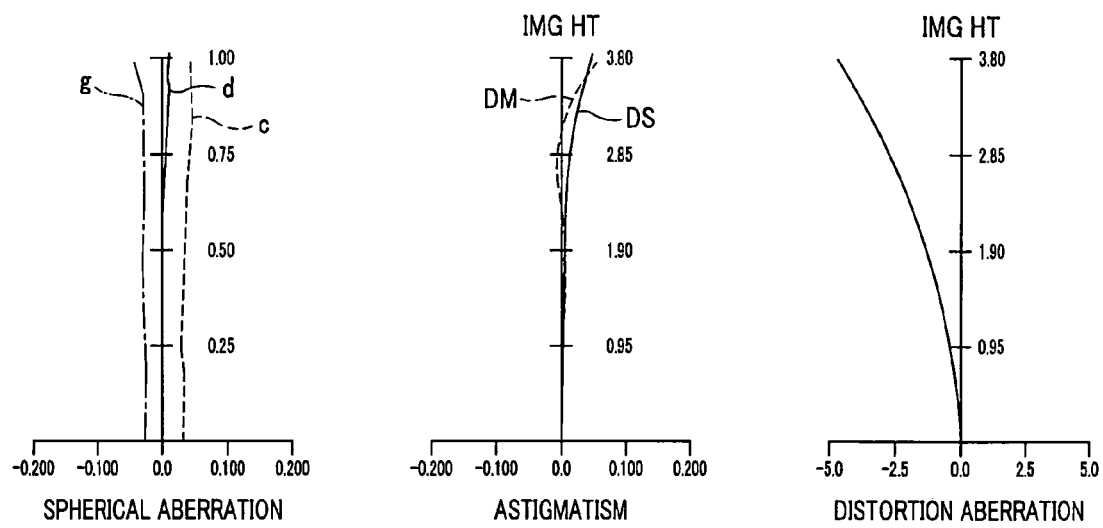
FIG. 4 is a view showing various aberrations at short focal length (distance) end of the embodiment 1 of the zoom lens to which the present invention is applied.
Figure 5:
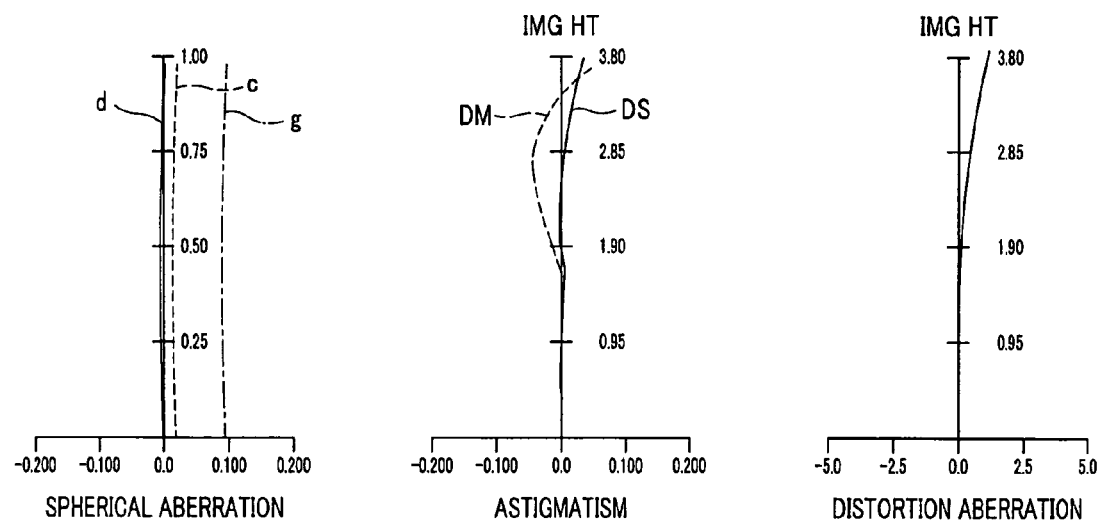
FIG. 5 is a view showing various aberrations at middle focal length end of the embodiment 1 of the zoom lens to which the present invention is applied.
Figure 6:
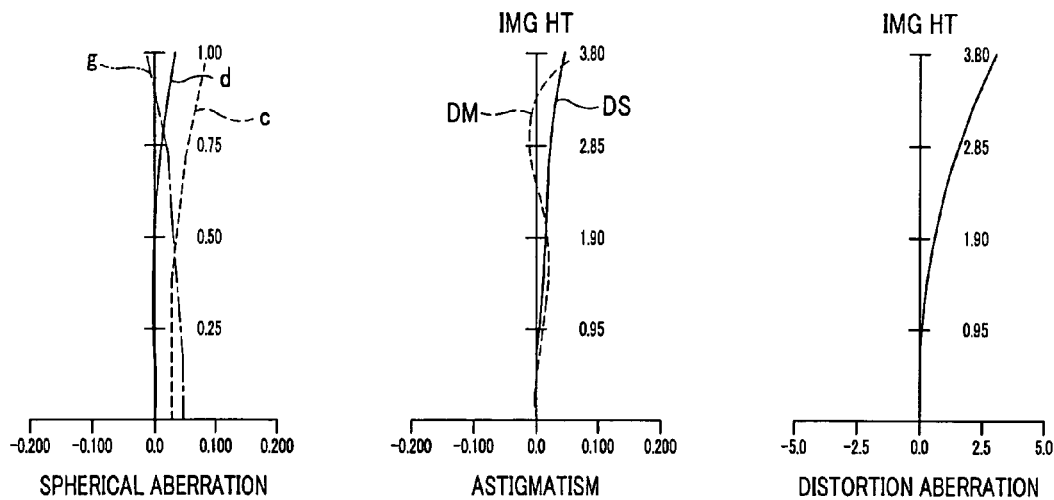
FIG. 6 is a view showing various aberrations at long focal length end of the embodiment 1 of the zoom lens to which the present invention is applied.
Figure 7:
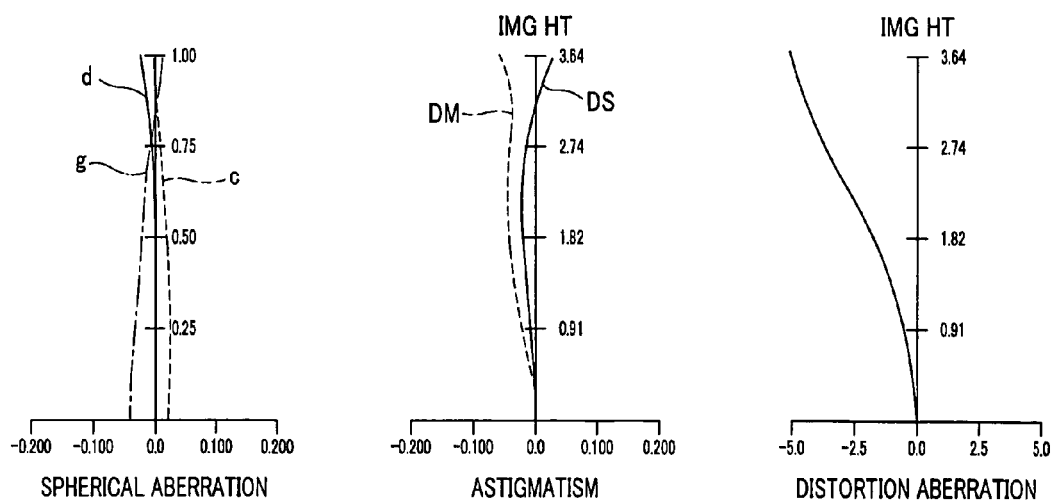
FIG. 7 is a view showing various aberrations at short focal length end of the embodiment 2 of the zoom lens to which the present invention is applied.
Figure 8:
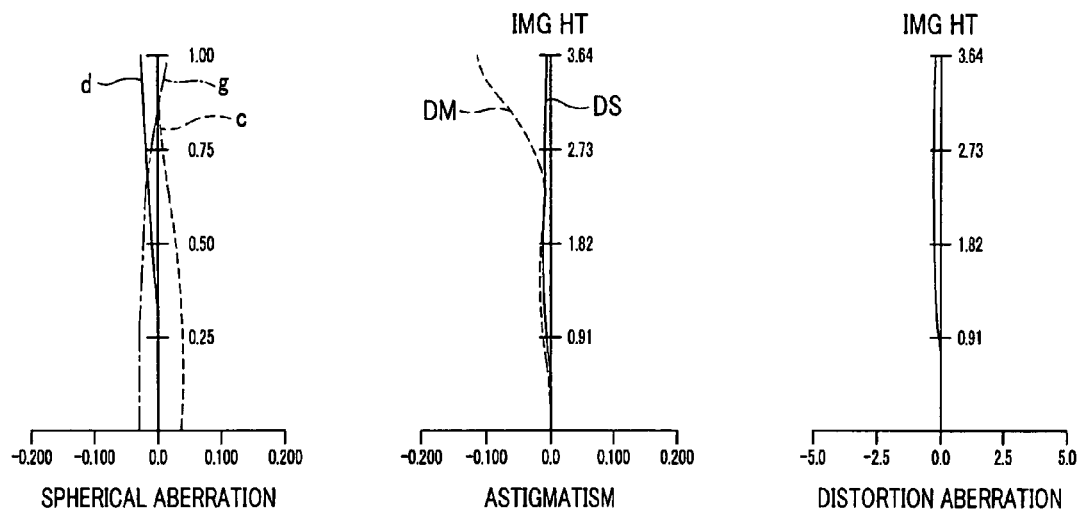
FIG. 8 is a view showing various aberrations at middle focal length of the embodiment 2 of the zoom lens to which the present invention is applied.
Figure 9:
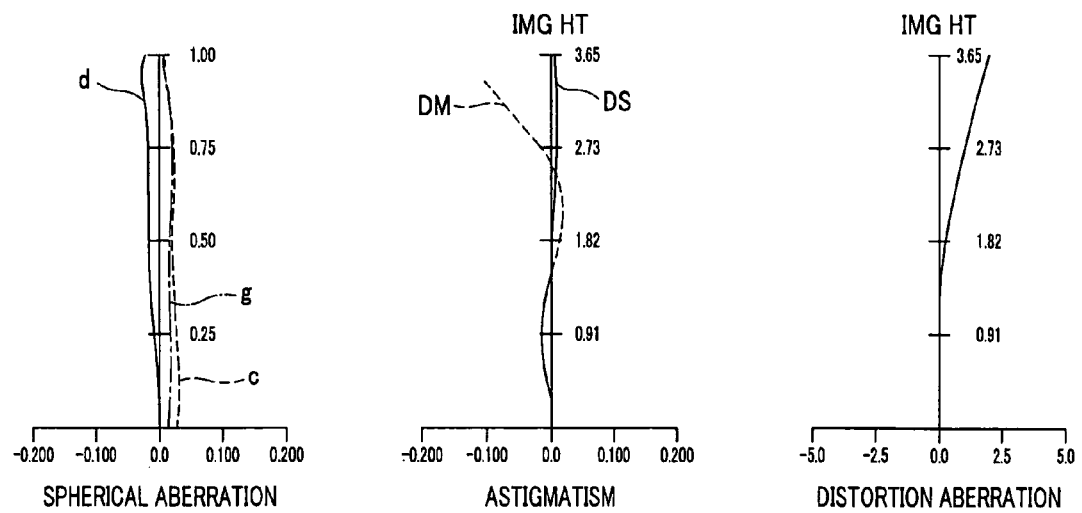
FIG. 9 is a view showing various aberrations at long focal length end of the embodiment 2 of the zoom lens to which the present invention is applied.
Figure 10:
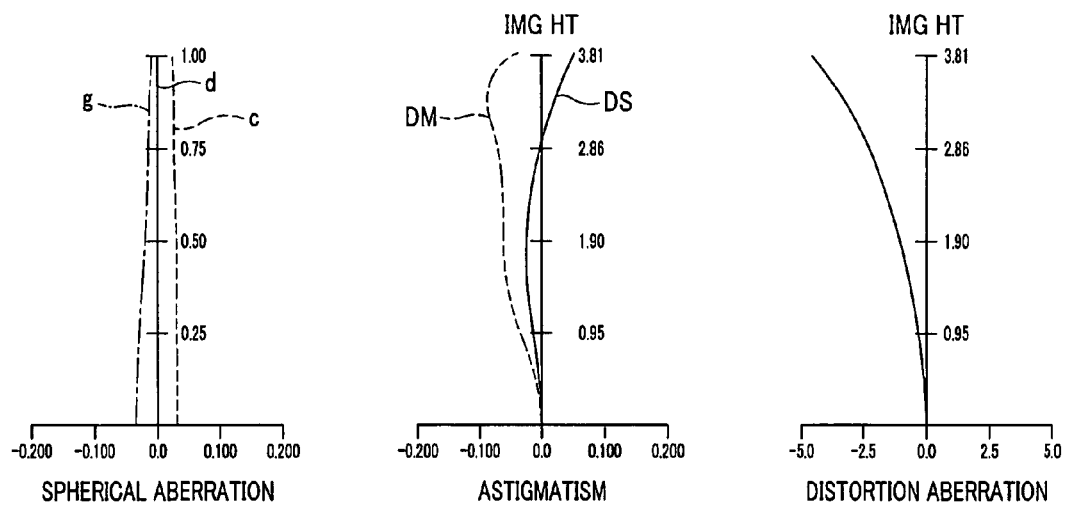
FIG. 10 is a view showing various aberrations at short focal length end of the embodiment 3 of the zoom lens to which the present invention is applied.
Figure 11:
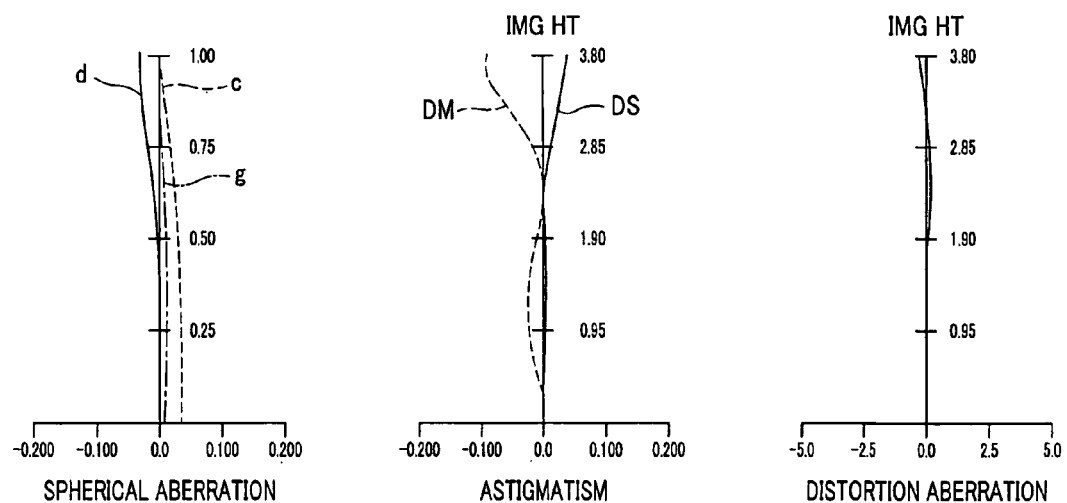
FIG. 11 is a view showing various aberrations at middle focal length end of the embodiment 3 of the zoom lens to which the present invention is applied.
Figure 12:
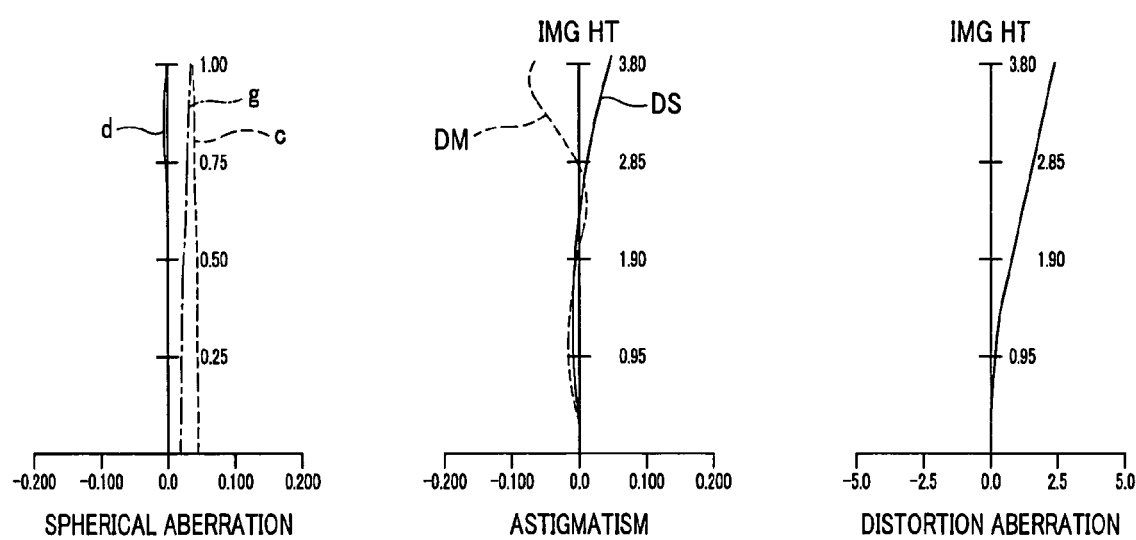
FIG. 12 is a view showing various aberrations at long focal length end of the embodiment 3 of the zoom lens to which the present invention is applied.

In performing magnification changing or adjusting operation from the wide angle end state shown in FIG. 3(a) to the telescopic end state shown in FIG. 3(b), the second lens group GR2 moves toward the fixed third lens group GR side, the fourth lens group GR4 moves toward the fixed third lens group GR3 side, and the fifth lens group GR5 moves toward the image surface side to a little degree.

In the above-described zoom lenses of the first to third embodiments, there is employed the configuration adapted for bending or folding the optical axis substantially by 90° by the reflection member to thereby have ability to shorten the length in the incident optical axis direction to much degree, and to have ability to overlap optical paths of rays of object light in the vicinity of the reflection surface. Accordingly, space can be effectively used so that miniaturization can be made. In the above-described zoom lens, the position of the reflection member is caused to be first lens group disposed at the side closest to the object, thereby making it possible to attain miniaturization of the image pick-up apparatus using zoom lens.

Further, at the time of sinking lens barrel, arrangement angle of the reflection member is changed to thereby withdraw the reflection member to accommodate the negative group of the first group into a space thus defined to have ability to attain miniaturization at the time of sinking lens barrel. Moreover, since the light quantity adjustment member for adjusting light quantity is fixed during zooming operation, the mirror cylindrical configuration can become compact.

Moreover, in the zoom lenses of the first to third embodiments, the front gem diameter and the reflection member can be reduced by the configuration at least including negative group at the object side of the reflection member of the first lens group.

Moreover, in both the zoom lenses of the first and third embodiments, since the light quantity adjustment member ST1 included within the third lens group is fixed, complicated mirror cylindrical configuration is not required so that compact and thin structure can be realized.

Further, in the zoom lens of the second embodiment, the light quantity adjustment member ST1 is fixed between the third lens group GR3 and the fourth lens group GR4. Thus, complicated mirror cylindrical configuration is not required so that compact and thin structure can be realized.

Further, in the zoom lenses of the first to third embodiment, since the second group functioning as magnification changing or adjusting system (variator) is caused to be of the configuration having negative refractive power, it is possible to reduce respective lens diameters in the entire system. Thus, miniaturization can be realized.

Then, the condition desired to be satisfied in the zoom lens system at least including a first group including a reflection member and a second group having negative refractive power as in the case of the first to third embodiments will be explained.

It is to be noted that while if individual conditions which will be described below are respectively satisfied by themselves, actions/effects corresponding thereto can be attained, it is a matter of course that a method of satisfying plural conditions is more desirable from the viewpoints of optical performance and/or miniaturization, etc.

It is desirable that the following conditional formula (1) is satisfied.

$$2.0 < |fa/fw| < 6.0 \tag{1}$$

In the above formula,
fa: focal length of lens group of the object side relative to the reflection member of the first lens group, and
fw: focal length of the entire system at the broad angle end.

The conditional formula (1) is the conditional formula for prescribing focal length of the lens group of the object side relative to the reflection member of the first group. When the condition is above the lower limit of the conditional formula (1), correction of the distortion aberration becomes difficult. When the condition is above the upper limit of the conditional formula (1), the front gem and the reflection member become large-sized so that miniaturization is difficult.

Moreover, as the light quantity adjustment member ST1, there may be used ND filter or liquid crystal light adjustment device in place of changing the iris diameter. In the case where the ND filter or the liquid crystal light adjustment device is used as the light quantity adjustment member ST1, further miniaturization can be realized.

The configuration of the zoom lens system used in the image pick-up lens apparatus to which the present invention is applied will be further explained in more concrete terms by taking numerical value data and aberration diagrams, etc.

The embodiments 1 to 3 mentioned as an example here respectively correspond to the previously described first to third embodiments, and the lens configuration diagrams showing the first to third embodiments (FIGS. 1 to 3) respectively show lens configurations of corresponding embodiments 1 to 3.

In numerical data of the respective embodiments, ri (i=1, 2, . . . ) indicates curvature of radius of the i-th plane surface counted from the object side, di (i=1, 2, . . . ) indicates the i-th axial spacing (mm) counted from the object side, ndi (i=1, 2, . . . ) indicates refractive index with respect to d line of the i-th optical element counted from the object side, and vdi (i=1, 2, . . . ) indicates Abbe number with respect to d line of the i-th optical element counted from the object side.

Moreover, among numerical data, the axial spacing (di) to which (variable) is attached indicates variable intervals at broad angle end (short focal length end, W)~middle (middle focal length end, M)~telescopic end (long focal length end, T) at zooming operation among the i-th axial spacing counted from the object side. Moreover, in the numerical data, FNo. indicates F number, f indicates focal length (mm), and ω indicates half picture angle (°), wherein values at the entire system corresponding to respective focal length states (W), (M), (T) are shown.

Further, in the numerical data, the plane surface indicated by (ASP) is non-spherical surface, and the shape of the non-spherical surface is the shape represented by the following formula.

$$x = \frac{y^2 \cdot c^2}{1 + (1 - \varepsilon \cdot y^2 \cdot c^2)^{1/2}} + \sum A^i \cdot Y^i \qquad \text{[Formula 1]}$$

In the above formula, x, y, c, ε and Ai are defined as below.

x: distance in the optical axis direction from the lens surface summit point,
y: height in a direction perpendicular to the optical axis
c: paraxial curvature at lens summit point
ε: circular cone constant
Ai: i-th non-spherical surface coefficient Moreover, respective numerical values and respective conditional formulas for determining the conditional formula (1) and the conditional formula (2) of the zoom lenses shown in the above-described embodiments 1 to 3 are shown in the Table 1.

FIGS. 4 to 12 show various aberrations (spherical aberration, astigmatism, distortion aberration in order from the left) of the embodiments 1 to 3. In the spherical aberration, ratio with respect to open F values is taken on the ordinate and defocus is taken on the abscissa, wherein solid line (d) indicates spherical aberration at d line, broken line (c) indicates spherical aberration at c line, and single dotted line (g) indicates spherical aberration at g line. In the astigmatism, the ordinate indicates image height (mm) and the abscission indicates focus, wherein solid line (DS) indicates image surface of sagittal and broken surface (DM) indicates image surface of meridional. In the distortion aberration, the ordinate indicates image height (mm) and the abscissa indicates distortion percentage. In this example, IMG HT indicates image height (mm).

As apparent from the Table 1, the zoom lenses of the embodiments 1 to 3 satisfy the conditional formula (1). Moreover, as shown in respective aberration diagrams of FIGS. 4 to 12, respective aberrations are corrected in well-balanced manner at the broad angle end (W), the middle focal length (M) between the broad angle end and the telescopic end, and the telescopic end (T).

| <<Embodiment 1>> | | | |
|---|---|---|---|
| | | (W)~(M)~(T) | |
| | FNo. = | 4.12~4.35~4.92 | |
| | f = | 7.00~11.79~19.85 | |
| | ω = | 29.61~17.68~10.54 | |
| | d6 = | 0.587~4.214~6.780 | |
| | d11 = | 6.693~3.066~0.500 | |
| | d14 = | 7.643~4.765~1.995 | |
| | d17 = | 1.766~4.645~7.415 | |
| [Radius of curvature] | [Axial spacing] | [Refractive index] | [Abbe number] |
| r1 = 23.443 | d1 = 1.100 | nd1 = 1.92286 | vd1 = 20.884 |
| r2 = 10.807 | d2 = 2.220 | | |
| r3 = ∞ | d3 = 8.500 | | |
| r4 = ∞ | d4 = 0.700 | | |
| r5 = 14.953 (ASP) | d5 = 2.134 | nd2 = 1.69350 | vd2 = 53.201 |
| r6 = −23.974 (ASP) | d6 = (variable) | | |
| r7 = 202.612 | d7 = 0.500 | nd3 = 1.83500 | vd3 = 42.984 |
| r8 = 7.547 | d8 = 0.924 | | |
| r9 = −9.603 | d9 = 0.450 | nd4 = 1.77250 | vd4 = 49.624 |
| r10 = 9.713 | d10 = 1.002 | nd5 = 1.92286 | vd5 = 20.884 |
| r11 = 90.443 | d11 = (variable) | | |
| r12 = 9.441(ASP) | d12 = 1.606 | nd6 = 1.69350 | vd6 = 53.201 |
| r13 = −29.152(ASP) | d13 = 1.000 | | |
| r14 = iris | d14 = (variable) | | |
| r15 = 11.703(ASP) | d15 = 2.075 | nd7 = 1.58313 | vd7 = 59.460 |
| r16 = −7.499 | d16 = 0.500 | nd8 = 1.92286 | vd8 = 20.884 |
| r17 = −13.695 | d17 = (variable) | | |
| r18 = 425.463 | d18 = 0.500 | nd9 = 1.92286 | vd9 = 20.884 |
| r19 = 5.175 | d19 = 1.738 | nd10 = 1.48749 | vd10 = 70.441 |
| r20 = 8.265 | d20 = 1.845 | | |
| r21 = 11.634 | d21 = 1.600 | nd11 = 1.92286 | vd11 = 20.884 |
| r22 = −279.750 | d22 = 3.607 | | |
| r23 = ∞ | d23 = 1.460 | nd12 = 1.51680 | vd12 = 64.198 |

-continued

| | | | |
|---|---|---|---|
| r24 = ∞ | d24 = 1.120 | | |
| r25 = ∞ | d25 = 0.500 | nd13 = 1.51680 | vd13 = 64.198 |
| r26 = ∞ | | | |

[Non-spherical data of the fifth plane (r5)]

$\epsilon = 1$, $A4 = -0.108291 \times 10-3$, $A6 = 0.720557 \times 10-5$, $A8 = -0.347966 \times 10-6$, $A10 = 0.551985 \times 10-8$

[Non-spherical data of the sixth plane (r6)]

$\epsilon = 1$, $A4 = -0.571799 \times 10-4$, $A6 = 0.925302 \times 10-5$, $A8 = -0.486215 \times 10-6$, $A10 = 0.882126 \times 10-8$

[Non-spherical data of the 12-th plane (r12)]

$\epsilon = 1$, $A4 = 0.442332 \times 10-3$, $A6 = 0.425787 \times 10-4$, $A8 = 0.351705 \times 10-6$, $A10 = 0.236139 \times 10-6$

[Non-spherical data of the 13-th plane (r13)]

$\epsilon = 1$, $A4 = 0.799183 \times 10-3$, $A6 = 0.560252 \times 10-4$, $A8 = -0.927656 \times 10-6$, $A10 = 0.443273 \times 10-6$

[Non-spherical data of the 15-th plane (r15)]

$\epsilon = 1$, $A4 = -0.108299 \times 10-3$, $A6 = 0.276604 \times 10-5$, $A8 = -0.244554 \times 10-6$, $A10 = 0.359026 \times 10-8$ <<Embodiment 2>>

(W)~(M)~(T)

| | |
|---|---|
| FNo. = | 2.87~4.34~5.53 |
| f = | 4.85~9.22~14.07 |
| ω = | 38.29~21.60~14.30 |
| d4 = | 0.780~4.152~0.780 |
| d8 = | 16.722~5.627~2.323 |
| d16 = | 2.243~9.966~16.642 |
| d17 = | 1.349~3.787~3.969 |
| d19 = | 3.640~1.202~1.020 |

| [Radius of curvature] | [Axial spacing] | [Diffractive index] | [Abbe Number] |
|---|---|---|---|
| r1 = 29.542 | d1 = 0.850 | nd1 = 1.88300 | vd1 = 40.805 |
| r2 = 11.271 | d2 = 3.800 | | |
| r3 = ∞ | d3 = 12.220 | | |
| r4 = ∞ | d4 = (variable) | | |
| r5 = 26.237(ASP) | d5 = 1.200 | nd2 = 1.73077 | vd2 = 40.501 |
| r6 = 5.980(ASP) | d6 = 2.320 | | |
| r7 = 12.918 | d7 = 2.740 | nd3 = 1.84666 | vd3 = 23.785 |
| r8 = 72.468 | d8 = (variable) | | |
| r9 = Aperture limiting member | d9 = 0.130 | | |
| r10 = 7.857(ASP) | d10 = 3.420 | nd4 = 1.58313 | vd4 = 59.461 |
| r11 = -26.882(ASP) | d11 = 1.200 | | |
| r12 = 11.250 | d12 = 2.938 | nd5 = 1.48749 | vd5 = 70.441 |
| r13 = -6.313 | d13 = 0.800 | nd6 = 1.67270 | vd6 = 32.171 |
| r14 = 5.285 | d14 = 0.913 | | |
| r15 = 16.649 | d15 = 1.525 | nd7 = 1.48749 | vd7 = 70.441 |
| r16 = -32.796 | d16 = (variable) | | |
| r17 = Light quantity adjustment member | d17 = (variable) | | |
| r18 = -47.622(ASP) | d18 = 1.900 | nd8 = 1.77377 | vd8 = 47.200 |
| r19 = -14.003(ASP) | d19 = (variable) | | |
| r20 = ∞ | d20 = 1.200 | nd9 = 1.51680 | vd9 = 64.198 |
| r21 = ∞ | d21 = 0.600 | | |
| r22 = ∞ | d22 = 0.500 | rd10 = 1.51680 | vd10 = 64.198 |
| r23 = ∞ | | | |

[Non-spherical data of the fifth plane (r5)]

$\epsilon = 1$, $A4 = -0.199102 \times 10-4$, $A6 = 0.120020 \times 10-4$, $A8 = -0.410454 \times 10-6$, $A10 = 0.617981 \times 10-8$

[Non-spherical data of the sixth plane (r6)]

$\epsilon = 1$, $A4 = -0.633623 \times 10-3$, $A6 = 0.841957 \times 10-5$, $A8 = -0.719036 \times 10-6$, $A10 = 0.414281 \times 10-8$

[Non-spherical data of the 10-th plane (r10)]

$\epsilon = 1$, $A4 = -0.387456 \times 10-3$, $A6 = 0.265755 \times 10-5$, $A8 = -0.858779 \times 10-6$, $A10 = 0.215789 \times 10-9$ -continued

[Non-spherical data of the 11-th plane (r11)]

$\epsilon = 1$, A4 = $-0.309607 \times 10-3$, A6 = $0.973513 \times 10-5$, A8 = $-0.183569 \times 10-5$, A10 = $0.398642 \times 10-7$

[Non-spherical data of the 18-th plane (r18)]

$\epsilon = 1$, A4 = $-0.338236 \times 10-3$, A6 = $-0.260827 \times 10-4$, A8 = $0.334152 \times 10-5$, A10 = $-0.688027 \times 10-7$

[Non-spherical data of the 19-th plane (r19)]

$\epsilon = 1$, A4 = $-0.183178 \times 10-3$, A6 = $-0.185327 \times 10-5$, A8 = $0.954236 \times 10-6$, A10 = $0.000000 \times 1000$ <<Embodiment 3>>

(W)~(M)~(T)

| | |
|---|---|
| FNo. = | 2.82~4.23~5.14 |
| f = | 5.06~7.83~9.60 |
| ω = | 38.18~25.91~21.13 |
| d4 = | 0.700~4.304~5.076 |
| d8 = | 6.662~3.058~2.286 |
| d11 = | 10.527~4.496~1.500 |
| d16 = | 3.087~10.618~13.768 |
| d18 = | 3.220~1.720~1.566 |

| [Radius of curvature] | [Axial spacing] | [Refractive index] | [Abbe Number] |
|---|---|---|---|
| r1 = 76.580 | d1 = 0.900 | nd1 = 1.83500 | vd1 = 42.984 |
| r2 = 11.916 | d2 = 2.300 | | |
| r3 = ∞ | d3 = 10.800 | | |
| r4 = ∞ | d4 = (variable) | | |
| r5 = 42.595(ASP) | d5 = 1.100 | nd2 = 1.52470 | vd2 = 56.236 |
| r6 = 9.730(ASP) | d6 = 1.400 | | |
| r7 = 9.061 | d7 = 1.545 | nd3 = 1.84666 | vd3 = 23.785 |
| r8 = 11.917 | d8 = (variable) | | |
| r9 = 12.346(ASP) | d9 = 1.500 | nd4 = 1.52470 | vd4 = 56.236 |
| r10 = 16.139(ASP) | d10 = 1.200 | | |
| r11 = iris | d11 = (variable) | | |
| r12 = 18.519 | d12 = 2.417 | nd5 = 1.83500 | vd5 = 42.984 |
| r13 = −22.568 | d13 = 0.500 | | |
| r14 = 9.647 | d14 = 3.938 | nd6 = 1.58913 | vd6 = 61.253 |
| r15 = −9.622 | d15 = 0.650 | nd7 = 1.78472 | vd7 = 25.721 |
| r16 = 6.790 | d16 = (variable) | | |
| r17 = 15.962(ASP) | d17 = 2.055 | nd8 = 1.52470 | vd8 = 56.236 |
| r18 = −35.130(ASP) | d18 = (variable) | | |
| r19 = ∞ | d19 = 2.000 | nd9 = 1.51680 | vd9 = 64.198 |
| r20 = ∞ | d20 = 0.700 | | |
| r21 = ∞ | d21 = 0.800 | nd10 = 1.51680 | vd10 = 64.198 |
| r22 = ∞ | | | |

[Non-spherical data of the fifth plane (r5)]

$\epsilon = 1$, A4 = $0.168244 \times 10-2$, A6 = $-0.507087 \times 10-4$, A8 = $0.850225 \times 10-6$, A10 = $0.000000 \times 1000$

[Non-spherical data of the sixth plane (r6)]

$\epsilon = 1$, A4 = $0.135697 \times 10-2$, A6 = $-0.407810 \times 10-4$, A8 = $-0.504262 \times 10-6$, A10 = $0.504475 \times 10-7$

[Non-spherical data of the ninth plane (r9)]

$\epsilon = 1$, A4 = $-0.187677 \times 10-2$, A6 = $-0.500809 \times 10-4$, A8 = $0.271658 \times 10-5$, A10 = $-0.166299 \times 10-6$

[Non-spherical data of the 10-th plane (r10)]

$\epsilon = 1$, A4 = $-0.160512 \times 10-2$, A6 = $-0.412232 \times 10-4$, A8 = $0.327336 \times 10-5$, A10 = $-0.142491 \times 10-6$

[Non-spherical data of the 17-th plane (r17)]

$\epsilon = 1$, A4 = $0.139219 \times 10-3$, A6 = $-0.344159 \times 10-4$, A8 = $0.140726 \times 10-5$, A10 = $-0.621230 \times 10-7$

[Non-spherical data of the 18-th plane (r18)]

$\epsilon = 1$, A4 = $0.573274 \times 10-3$, A6 = $-0.144671 \times 10-4$, A8 = $-0.686048 \times 10-6$, A10 = $0.000000 \times 1000$

TABLE 1

| Conditional Formula | Embodiment 1 | Embodiment 2 | Embodiment 3 |
|---|---|---|---|
| (1) \|fa/fw\| | 3.204 | 3.592 | 3.167 |

The zoom lens system of the present invention as described above may be used in image pick-up apparatus adapted for forming an object image by the zoom lens to allow image pick-up device or element such as CCD or silver salt film to receive that image to perform photographing, especially digital still camera or video camera (personal computer as information processing apparatus, telephone and/or mobile telephone, etc.).

The image pick-up apparatus to which the present invention is applied will be explained by using FIG. 15.

Figure 15:
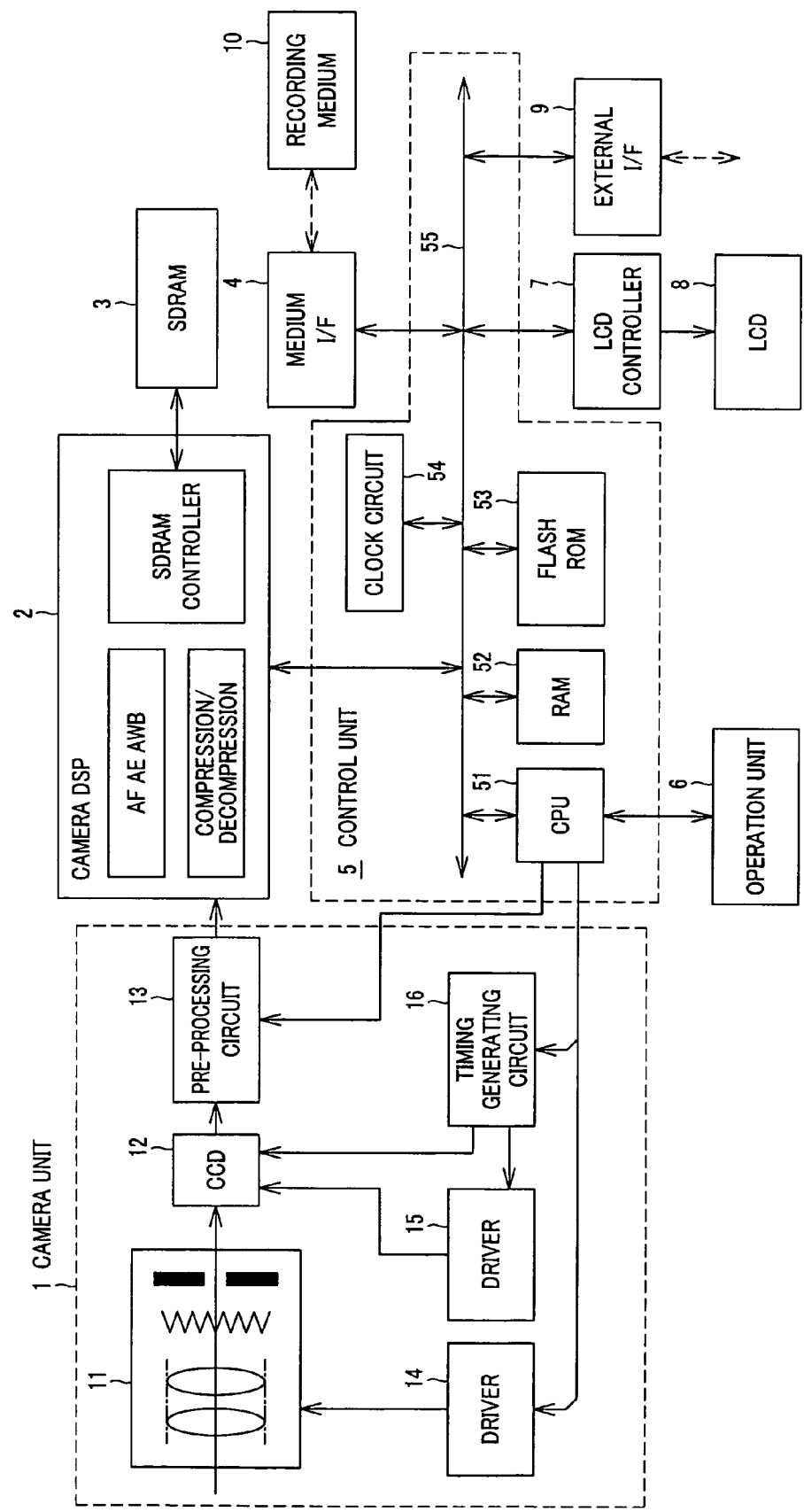
FIG. 15 is a block diagram of an image pick-up apparatus to which the present invention is applied.

FIG. 15 is a block diagram for explaining the image pick-up apparatus to which the present invention is applied. When roughly classified, as shown in FIG. 15, the image pick-up apparatus comprises a camera unit 1, a camera DSP (Digital Signal Processor) 2, a SDRAM (Synchronous Dynamic Random Access Memory) 3, a medium interface (hereinafter referred to as medium I/F) 4, a control unit 5, an operation unit 6, a LCD (liquid Crystal Display) controller 7, a LCD 8, and an external interface (hereinafter referred to as external I/F) 9, wherein the recording medium 10 is detachably loaded.

While it is conceivable to use, as the recording medium 10, memory or storage such as the so-called memory card using semiconductor memory, optical recording medium such as recordable DVD (Digital Versatile Disc), etc. and/or magnetic disc, etc., explanation will be given on the assumption that, e.g., memory card is used as the recording medium 10 in this embodiment.

Further, as shown in FIG. 15, the camera unit 1 comprises an optical block 11, a CCD (Charge Coupled Device) 12 as image pick-up device, a preprocessing circuit 13, a driver 14 for optical block, a driver 15 for CCD, and a timing generating circuit (timing generator) 16. In this example, the optical block 11 comprises lenses, focus mechanism, shutter mechanism, and/or iris mechanism, etc.

Moreover, the control unit 5 is a microcomputer caused to be of the configuration in which a CPU (Central Processing Unit) 51, a RAM (Random Access Memory) 52, a flash ROM (Read Only Memory) 53, and a clock circuit 54 are connected through a system bus 55, and is adapted to have ability to control respective units of the image pick-up apparatus of this embodiment.

Here, the RAM 52 is used mainly as a work area for temporarily storing result in the middle of processing, etc. Moreover, in the flash ROM 53, there are stored various programs executed in the CPU 51 and/or data necessary for processing, etc. Moreover, the clock circuit 54 can provide current year/month/day, current day of week and/or current time, and there may be also provided photographing date and hour.

Further, at the time of photographing image, the optical block driver 14 forms, in accordance with control from the control unit 5, a drive signal for allowing the optical block 11 to be operative to deliver the drive signal thus formed to the optical block 11 to allow the optical block 11 to be operative. In the optical block 11, the focus mechanism, the shutter mechanism and the iris mechanism are controlled in accordance with the drive signal from the optical block driver 14 to take image of object thereinto to offer the image thus taken in to the CCD 12.

The CCD 12 serves to perform photoelectric conversion of image from the optical block 11 to provide an output. The CCD 12 becomes operative in accordance with a drive signal from the CCD driver 15 to take thereinto image of object from the optical block 11, and delivers, to the preprocessing circuit 13, image (image information) of object which have been taken in as an electric signal on the basis of a timing signal from the timing generating circuit 16 controlled by the control unit 5.

In this example, as described above, the timing generating circuit 16 serves to form a timing signal which provides a predetermined timing in accordance with control from the control unit 5. Moreover, the CCD driver 15 serves to form a drive signal to be delivered to the CCD 12 on the basis of a timing signal from the timing generating circuit 16.

The pre-processing circuit 13 performs CDS (Correlated Double Sampling) processing with respect to image information of an electric signal delivered thereto to maintain satisfactory S/N ratio, and performs AGC (Automatic Gain Control) processing to control gain to further perform A/D (Analog/Digital) conversion to form image data caused to be a digital signal.

The image data caused to be digital signal from the pre-processing circuit 13 is delivered to the DSP2. The DSP2 implements camera signal processing such as AF (Auto Focus), AE (Auto Exposure), and/or AWB (Auto White Balance), etc. to the image data delivered thereto. The image data variously adjusted in this way is caused to undergo data compression by a predetermined compression processing. The compressed data thus processed is delivered to the recording medium 10 which has been loaded at the image pick-up apparatus of this embodiment through the system bus 55 and the medium I/F 4, and is recorded onto the recording medium 10 as file as described later.

Moreover, desired one of the image data which have been recorded onto the recording medium 10 is read out from the recording medium 10 through the medium I/F 4 in accordance with operation input from user which has been accepted through the operation unit 6 comprised of touch panel or control key, etc. The image data thus read out is delivered to the DSP2.

The DSP2 performs decompression processing (expansion processing) of data compression of image data, which has been caused to undergo data compression, delivered through the medium I/F 4 to deliver the decompressed image data to the LCD controller 7 through the system bus 55. The LCD controller 7 serves to form an image signal to be delivered to the LCD 8 from the image data which has been delivered thereto to deliver the image signal thus formed to the LCD 8. Thus, image corresponding to image data recorded on the recording medium 10 is displayed on display screen of the LCD 8.

In this example, the form of display of image is in accordance with display processing program recorded in the ROM. Namely, this display processing program is a program indicating recording mechanism of the file system and how to reproduce image.

Moreover, in the image pick-up apparatus of this embodiment, there is provided external I/F 9. The image pick-up apparatus is connected to, e.g., external computer through the external I/F 9 to receive supply of image data from the personal computer to record the image data onto recording medium loaded at the image pick-up apparatus itself, or to also have ability to deliver image data recorded on the recording medium which has been loaded at the image pick-up apparatus itself to external personal computer, etc.

Further, communication module may be connected to the external I/F 9 to thereby connect it to network, e.g., Internet, etc. to acquire various image data and/or other information through the network to record image data onto recording medium which has been loaded at the image pick-up apparatus itself, or to have ability to transmit data which has been recorded on the recording medium which has been loaded at the image pick-up apparatus itself to the target opposite side through the network.

In addition, also with respect to information such as image data, etc. which has been acquired through external personal computer or network and has been recorded onto the recording medium, as described later, it is a matter of course to read out such information at the image pick-up apparatus of this embodiment to reproduce the information which has been read out to display the information on the LCD 8 so that user can utilize it.

It is to be noted that the external I/F 9 may be provided as interface for wire such as IEEE (Institute of Electrical and Electronics Engineers) 1394 USB (Universal Serial Bus), etc., or may be provided as wireless interface by light or electric wave. Namely, the external I/F 9 may be either wire interface or wireless interface.

As stated above, the image pick-up apparatus of this embodiment can photograph an image of object to record the image thus obtained onto recording medium which has been loaded at the image pick-up apparatus, and can read out image data which has been recorded on the recording medium to reproduce the image data which has been read out to utilize it. Moreover, the image pick-up apparatus may accept offer of image data through external personal computer or network to record the image data thus obtained onto recording medium which has been loaded at the image pick-up apparatus itself, or to read out the image data to reproduce it.

It is to be noted that while CCD is used as the image pick-up device, CMOS (Complementary Metal-Oxide Semiconductor) sensor may be used.

It is to be noted that while the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by appended claims.

INDUSTRIAL APPLICABILITY

The zoom lens to which the present invention is applied not only may be used in digital still camera and/or video camera, but also may be used for silver salt camera by arranging silver salt film in place of CCD. Further, the zoom lens to which the present invention is applied may be used in camera included within personal computer, telephone and/or mobile telephone, and/or externally attached thereto.

The invention claimed is:

1. A zoom lens composed of plural groups and adapted to change group spacing or spacings to thereby perform magnification changing operation, the zoom lens comprising:

a first group at least including a reflection member for bending or folding the optical axis and a negative subgroup at an object side relative to the reflection member, said first group being fixed during magnification changing operation;

a second group movably provided during magnification changing operation at an image side of the first group and having negative refractive power; and a third group including a positive lens having non-spherical surfaces at both surface sides thereof, and a light quantity adjustment member at the image surface side, the light quantity adjustment member being fixed during magnification changing operation, wherein the zoom lens is located within a lens barrel and said negative subgroup undergos a lens barrel sinking operation, and wherein, when the negative subgroup is caused to undergo said lens barrel sinking operation, the reflection member is withdrawn by being rotated with a fulcrum which is not limited to one end side of the reflection member, and the negative subgroup of the first groups is accommodated into a space thus vacated by the withdrawn reflection member.

2. The zoom lens according to claim 1, wherein the negative subgroup of the object side relative to the reflection member of the first group satisfies the following formula (1), $$2.0 < |fa/fw| < 6.0 \tag{1}$$

In the above formula, fa: focal length of the negative subgroup of the object side relative to the reflection member of the first group, and fw: focal length at broad angle end.

3. An image pick-up device comprising:

a zoom lens composed of plural groups and adapted to change group spacing or spacings to thereby perform magnification changing operation; and an image pick-up device for converting an optical image which has been formed by the zoom lens into an electric signal, the zoom lens at least including:

a first group at least including a reflection member for bending or folding the optical axis and a negative subgroup at an object side relative to the reflection member, said first group being fixed during magnification changing operation;

a second group movably provided during magnification changing operation at an image side of the first group and having negative refractive power; and a third group including a positive lens having non-spherical surfaces at both surface sides thereof, and a light quantity adjustment member at the image surface side, the light quantity adjustment member being fixed during magnification changing operation, wherein the zoom lens is located within a lens barrel and said negative subgroup undergos a lens barrel sinking operation, and wherein, when the negative subgroup is caused to undergo said lens barrel sinking operation, the reflection member is withdrawn by being rotated with a fulcrum which is not limited to one end side of the reflection member so that the negative subgroup of the first group is accommodated into a space thus vacated by the withdrawn reflection member.

4. The image pick-up apparatus according to claim 3, wherein the negative subgroup of the object side relative to the reflection member of the first group satisfies the following formula (2), $$2.0 < |fa/fw| < 6.0 \tag{2}$$

In the above formula, fa: focal length of the negative subgroup of the object side relative to the reflection member of the first group, and fw: focal length at broad angle end.

* * * * *